United States Patent
Domeniconi (10) Patent No.: US 10,569,448 B2
(45) Date of Patent: *Feb. 25, 2020

(54) SUCTION OR BLOW THERMAL ROLLER (71) Applicant: GTK Timek Group SA, Rivera-Monteceneri (CH)

(72) Inventor: Lorenzo Domeniconi, Agno (CH)

(73) Assignee: GTK TIMEK GROUP SA, Rivera-Monteceneri (CH)

( * ) Notice: Subject to any disclaimer, the term of this patent is extended or adjusted under 35 U.S.C. 154(b) by 254 days.

This patent is subject to a terminal disclaimer.

(21) Appl. No.: 15/453,045

(22) Filed: Mar. 8, 2017

(65) Prior Publication Data

US 2017/0259466 A1 Sep. 14, 2017

(30) Foreign Application Priority Data

Mar. 8, 2016 (IT) .......................... 102016000024330

(51) Int. Cl.
*B29C 35/04* (2006.01)
*D21F 3/10* (2006.01)
(Continued)

(52) U.S. Cl.
CPC .......... *B29C 35/041* (2013.01); *B41F 23/042* (2013.01); *B65H 27/00* (2013.01);
(Continued)

(58) Field of Classification Search
CPC .... B29C 35/041; B29C 35/045; B41F 23/042
See application file for complete search history.

(56) References Cited

U.S. PATENT DOCUMENTS 3,425,488 A * 2/1969 Jarreby ................. F28D 11/00
165/90
3,625,280 A * 12/1971 Peter ....................... F28F 5/02
165/90

(Continued)

FOREIGN PATENT DOCUMENTS

DE   10 2006 001 908 A1   7/2007
DE   102006001908 A1 *   7/2007   ........... D21G 1/0266
(Continued)

OTHER PUBLICATIONS

Ministero dello Sviluppo Economico, Rapporto Di Ricerca, Aug. 3, 2016, GTK Timek Group SA (Year: 2016).*
(Continued)

*Primary Examiner* — Matthew J Daniels
*Assistant Examiner* — Wayne K. Swier
(74) *Attorney, Agent, or Firm* — Young & Thompson (57) ABSTRACT

A suction or blow thermal roller includes: a cylindrical body extending along a longitudinal direction; the cylindrical body including at least one inner tubular element and at least one outer tubular element that is concentrically arranged around the inner tubular element; the inner tubular element includes an outer diameter d and the outer tubular element includes an inner diameter D, being D>d; two hubs, each arranged at one end of the cylindrical body; at least one heat-exchange chamber realized between the inner tubular element and the outer tubular element. The roller includes a coating layer for the inner tubular element. The coating layer includes at least one rib arranged along a helical path around the longitudinal direction. The at least one rib is made in one piece in the coating layer, realizing at least one helical channel between the coating layer and the outer tubular element.

9 Claims, 5 Drawing Sheets (51) Int. Cl.
  *B41F 23/04* (2006.01)
  *D21G 1/02* (2006.01)
  *B65H 27/00* (2006.01)
  *B29K 101/12* (2006.01)
  *B29L 7/00* (2006.01)

(52) U.S. Cl.
  CPC ............ *D21F 3/10* (2013.01); *D21G 1/0266* (2013.01); *B29K 2101/12* (2013.01); *B29L 2007/008* (2013.01); *B65H 2301/5143* (2013.01); *B65H 2301/5144* (2013.01); *B65H 2404/1361* (2013.01); *B65H 2404/1362* (2013.01); *B65H 2404/1363* (2013.01); *B65H 2406/3614* (2013.01)

(56) References Cited

U.S. PATENT DOCUMENTS

| | | | | |
|---|---|---|---|---|
| 4,202,542 A | * | 5/1980 | Lammers | B65H 5/226 271/195 |
| 4,207,998 A | * | 6/1980 | Schmid | B65H 20/12 226/193 |
| 4,705,199 A | * | 11/1987 | Herman | B65H 5/226 226/95 |
| 5,024,729 A | * | 6/1991 | Kuhasalo | D21F 3/10 162/368 |
| 5,103,898 A | * | 4/1992 | Krimsky | B65H 20/12 165/89 |
| 5,114,062 A | * | 5/1992 | Kuhn | B65H 18/20 226/95 |
| 5,292,298 A | * | 3/1994 | Scannell | B21B 27/08 492/46 |
| 6,250,376 B1 | * | 6/2001 | Hendrix | D21F 5/028 165/89 |
| 7,654,427 B1 | * | 2/2010 | Tsai | B65H 20/12 226/20 |
| 2007/0149376 A1 | * | 6/2007 | Holtmann | B65H 20/12 492/16 |
| 2017/0259466 A1 | * | 9/2017 | Domeniconi | B29C 35/041 |
| 2018/0202725 A1 | * | 7/2018 | Domeniconi | B41F 13/22 |

FOREIGN PATENT DOCUMENTS

| | | | | |
|---|---|---|---|---|
| WO | 2004/052764 A1 | | 6/2004 | |
| WO | WO-2004052764 A1 | * | 6/2004 | ............ B65H 20/12 |
| WO | 2015/189751 A1 | | 12/2015 | |

OTHER PUBLICATIONS

Human Translation of DE102006001908A1 (Year: 2006).*
Machine Translation of WO2004052764 (Year: 2003).*
Machine Translation DE 10 2006 001 908 (Year: 2007).*
Italian Search Report issued in Application No. UA20161465, dated Nov. 18, 2016.

* cited by examiner

SUCTION OR BLOW THERMAL ROLLER

FIELD OF THE INVENTION

The present invention concerns a suction or blow thermal roller.

KNOWN ART

Thermal rollers and suction rollers are all known.

In particular, thermal rollers have very wide industrial applications, for example thermal rollers operate in modifying (increasing or decreasing) the temperature of a film (made of paper, PVC, aluminum, fabric, etc.) they are in contact with. Heat transfer mainly happens by conduction, i.e. by contact between the film and the roller. The roller operation can be accepted when the temperature difference between the two film sides is lower than 1° C.

For this purpose, usually thermal rollers are constituted by a cylindrical body provided with one heat-exchange chamber and one inlet and one outlet for a thermal fluid circulating in a closed circuit provided with a system pumping and cooling/heating the thermal fluid coming/being delivered from/to the roller. The inlet and the outlet of the thermal fluid are obtained in the hubs arranged at the opposite ends of the cylindrical body, a hub generally having the inlet and the other one the outlet. Anyway, there are applications in which the inlet and the outlet of the thermal fluid are made in the same hub.

The thermal fluid is usually water, or else water with added glycol.

There are a lot of different ways to implement the heat-exchange chamber, for example the so-called simple chamber is known, i.e. a chamber whose annulus section is obtained in the interspace between the inner and the outer bodies.

In applications in which higher positioning precision is required for the support on the table, the arrangement of the suction roller machine is also known.

Typical applications using suction roller are, for example:
precision prints (for example, PCB supports);
wrapping of fragile supports (such as PVC films);
wrapping of bioriented films;
keeping the support tension to avoid loop forming;
keeping the support position on the roller in case of acceleration (Stop & Go) (to avoid slipping between roller and support).

The suction rollers usually on the market have a quite simple structure constituted by a cylindrical element having, on its side outer surface, a series of holes communicating with a suctioning circuit adapted to generate a suction force on the support running on the outer surface of the cylindrical element.

The cylindrical element is supported at the two head ends by two hubs.

The suction circuit conveys the suctioned air to a suction unit (such as a vacuum pump) outside of the roller.

Typically, the circuit is constituted by the tube embodied by the cylindrical element itself, a coaxial hole made in one of the supporting hubs of the cylindrical element and a revolving body.

The Applicant noticed that machines having both roller types arranged in series, even if they have better production efficiency, on the other hand they are very expensive and bulky, above all.

The Applicant further observed that usually these machines can have, due to the double of components, less reliability, because of higher failure probability. Consequently, such machines can have higher probability of machine downtime and higher maintenance costs.

The Applicant tackled the problem of implementing a roller that reduces the bulk and overall costs of machines equipped with thermal and suction rollers arranged in series.

The Applicant tackled the problem of implementing a roller that reduces the number of components with respect to a thermal roller and a suction roller arranged in series and, consequently, increases the machine reliability.

The Applicant posed itself also the problem of implementing a new roller type being, at the same time, a thermal roller and a suction or blow roller.

SUMMARY OF THE INVENTION

Therefore, in its first aspect the invention concerns a suction or blow thermal roller comprising:

a cylindrical body extending along a longitudinal direction; said cylindrical body comprising at least one inner tubular element and at least one outer tubular element that is concentrically arranged around said inner tubular element; said inner tubular element comprises an outer diameter d and said outer tubular element comprises an inner diameter D, being D>d;

two hubs, each arranged at one end of the cylindrical body;

at least one heat-exchange chamber realized between said inner tubular element and said outer tubular element;
characterized by comprising a coating layer for said inner tubular element;

said coating layer comprises at least one rib arranged along a helical path around said longitudinal direction; said at least one rib being made in one piece in the coating layer and realizing at least one first helical channel between said coating layer and said outer tubular element;

said first helical path being made at least partially in said coating layer so that said at least one rib forms the side walls of said helical path;

said rib comprising a plurality of radial pass-through channels;

said outer tubular element comprising a plurality of first suction holes communicating with said radial pass-through channels;

said radial pass-through channels communicating with an air suction assembly.

In the scope of the present invention:

with "longitudinal direction" or "longitudinally" is meant a direction generically facing the direction of main extension of the roller, the longitudinal direction usually coincides with the rotation axis of the roller itself.

with "radial direction" or "radially" is meant a direction, or with a direction, orthogonal with respect to the longitudinal axis of the roller, which is arranged along a radius starting from the rotation axis of the roller.

with "counter-inclined", referred to two inclined planes, surfaces, walls, is meant that the two planes, surface, walls all have the same inclination, in terms of absolute value but with opposite sign, with respect to an axis interposed therebetween.

with inclination angle of the helix, is meant the angle formed by the helix tangent, therefore the rib tangent, with a plane perpendicular to the axis of the cylindrical body.

In the above said aspect, the present invention can have at least one of the preferred characteristics hereinafter described.

Preferably, the air suction assembly comprises:

at least one first suction duct arranged, at least in part, inside said inner tubular element so that said radial pass-through channels are connected to one another;

at least one coupling member for a suction source fluidically connected to said at least one first suction duct.

Advantageously, the coating layer is made of plastic material.

Preferably, the suction thermal roller comprises a second helical suction channel arranged between a ridge of the rib and the outer tubular element.

Conveniently, the rib comprises two sealing edges longitudinally spaced and opposed with respect to said second helical channel, which abut against the inner surface of the outer tubular element so that a seal for the air suction is realized.

Advantageously, the second helical channel has a trapezium-like section with height in the range from 0 to 500 mm and base in the range from 0 and 1000 mm.

Preferably, the coating layer made of plastics has minimum thickness s greater than 0.5 mm.

Conveniently, each rib has a shaped section that is tapered while radially leaving the longitudinal direction.

Advantageously, each radial channel is arranged at a first suction hole.

Preferably, the first suction duct has a plurality of second suction holes communicating with the radial channels.

Conveniently, the first suction duct communicates with said coupling member for a suction source, through a second suction duct obtained in at least one hub.

Advantageously, each rib has two opposite inclined walls, each inclined wall having an α angle whose absolute value is comprised in the range 90 to 180°.

BRIEF DESCRIPTION OF THE DRAWINGS

Further characteristics and advantages of the invention will be more evident from the detailed description of some preferred embodiments, but not exclusive, of a suction or blow thermal roller according to the present invention.

This description will be presented hereinafter by referring to the attached drawings, provided for illustration purposes only and without limitation, in which.

DETAILED DESCRIPTION OF EMBODIMENTS OF THE INVENTION

Referring to FIGS. 1-5, a suction or blow thermal roller according to the present invention is denoted with the numeral reference 1.

In the following we refer to a suction thermal roller, being understood that what stated goes for even if the roller would be used to blow onto the support sliding on the outer tubular element described hereinafter.

Referring to the embodiment shown in figures, the suction thermal roller 1 is constituted by a cylindrical body 2 extending along a longitudinal direction X-X. The cylindrical body 2 has an inner tubular element 3 and an outer tubular element 4 that is concentrically arranged around the inner tubular element 3.

The outer tubular element 4 is the element contacting the film 22 to be cooled/heated and suctioned.

The inner tubular element 3 and the outer tubular element 4 have substantially circular sections. In detail, the inner tubular element 3 has an outer diameter D2 and the outer tubular element 4 has an inner diameter D1, where D1>D2.

At the end of the cylindrical body 2 there are two hubs 6, each arranged at one end of the cylindrical body 2. The hubs 6 close the outer tubular element 4.

The hubs 6 are shaped to allow the motion of the fluid from/to a heat-exchange chamber 10 obtained between the inner tubular element 3 and the outer tubular element 4, better described hereinafter.

The hubs 6 further have the function of keeping in position the outer tubular element 4 and the inner tubular element 3 and to allow the thermal roller itself to be positioned in the machine, at the ends of the stems/shanks there are seats for accommodating the bearings 46.

Both the outer tubular element 4 and the inner tubular element 3 are supported by hubs 6.

The outer tubular element 4 is keyed on the hubs 6 and, consequently, sustained by the latter. An O-ring gasket or the addition of specific sealing mastic, not shown in figures, prevents the fluid from outflowing into the area where the hub 6 contacts the outer tubular element 4. The hubs 6 are generally made of metal material.

Conveniently, the inner tubular element 3 comprises two plug elements 17 fastened at its ends. The plug elements 17 have the function of closing the inner tubular element 3 and allowing the coupling with the hubs 6.

To allow the coupling with the hubs 6, each plug elements 17 has a housing seat 18 for at least one fastening element 19, such as a fastening screw.

The plug elements 17 further have at least one suction through-hole 47.

The plug elements 17 are usually made of metal by turning and grinding works. The plug elements 17 are assembled on the inner tubular element 3 and then welded.

The thermal roller 1 is in fluidic communication with a preferably closed circuit, the latter comprising a pumping system and a system for cooling/heating a thermal fluid coming/being delivered from/to the thermal roller 1. The closed circuit is not shown in figures.

In the embodiment shown in figures, a hub 6 has the inlet 7 for the thermal fluid, whereas the other hub 6 has the outlet 8 for the thermal fluid.

According to another embodiment not shown in figures, a hub 6 can comprise both the inlet 7 and the outlet 8 of the thermal fluid.

The inlet 7 and the outlet 8 of the thermal fluid, through two radial ducts 9, are in fluidic communication with a heat-exchange chamber 10 obtained between the inner tubular element 3 and the outer tubular element 4.

At the heat-exchange chamber 10 and substantially for the whole extent in the longitudinal direction X-X of the inner tubular element 3, there is a coating layer 11 preferably made of plastics.

The plastic material of coating layer 11 can be selected from a thermoplastic material, a thermosetting material, an elastomeric material or a combination thereof.

Examples suitable of thermoplastic materials are: polyethylene (HDPE/LDPE), polystyrene (PS); polyethylene terephthalate (PET); polypropylene (PP); polyamide (PA, Nylon); celluloid; polylactic acid; polyurethane.

On the contrary, examples of thermosetting materials suitable for the purpose are: phenol formaldehyde resins; epoxy resins, vinyl ester resins.

At last, examples of elastomeric materials are: SBR, NBR, EPDM, NR, CR, Silicone.

The coating layer 11 is like a cylindrical sheath having minimum thickness in the radial direction. The minimum thickness s is preferably smaller or equal to 0.5 mm. The Applicant believes that a minimum thickness s lower than 0.5 mm would lead to a poor insulation of the heat-exchange chamber 10 with respect to the inner tubular element 3.

Preferably, the minimum thickness s is comprised in the range 0.5 to 500 mm, limits included.

According to an embodiment not shown, the coating layer 11 could be present only under the rib and therefore its thickness could be equal to zero between the two adjacent longitudinal spires 15.

The coating layer 11 made of plastics has two ending portions 20 extending in the longitudinal direction X-X beyond the inner tubular element 3.

In detail, the coating layer 11 made of plastics has at its own end two annular portions 20 extending beyond the axial direction X-X of the inner tubular element 3.

The annular portions 20 are bent radially towards the inside of the inner tubular element 3 and are housed in a seat 21 made between each plug element 17 and a hub 6.

The seat 21 is made so that the annular portion 20 of the coating layer 11 extending in the longitudinal direction X-X beyond the inner tubular element 3, when the plug element 17 is coupled with the respective hub 6, are closed and compressed between a hub 6 and a plug element 17.

The coating layer 11 made of plastics has at least one rib 12 extending along a helical path around the longitudinal direction X-X substantially for the whole extent of the inner tubular element 3. The rib 12 is made in one piece with the coating layer 11. In other terms, there are no fastening elements between the coating layer 11 and the rib 12.

The helical path of the rib 12 is defined by the inclination angle β of the helix.

Such an angle β is comprised between 0° and 90° and can vary along the longitudinal extent X-X of the same path.

The rib 12 has such a height in the radial direction h to abut against the radially inner surface 14 of the outer tubular element 2 so that a first helical channel 13, arranged between the coating layer 11 and the outer tubular element 2, can be realized.

The first helical channel 13 is then realized at least partially in the coating layer 11 and, according to this first embodiment, between two spires 15 or windings adjacent in the longitudinal direction of the rib 12.

In other terms, according to this first embodiment, the section of the first helical channel 13 is delimited in the longitudinal direction by two walls 16 facing the two adjacent spires 15 or windings of the rib 12 and, in the radial direction, is delimited on top by the radially inner surface 14 of the outer tubular element 2 and on the bottom between the coating portion between the two longitudinally adjacent spires 15.

The section of the first helical channel 13 has a height E comprised between 0.5 and 500 mm, limits included.

Figure 4:
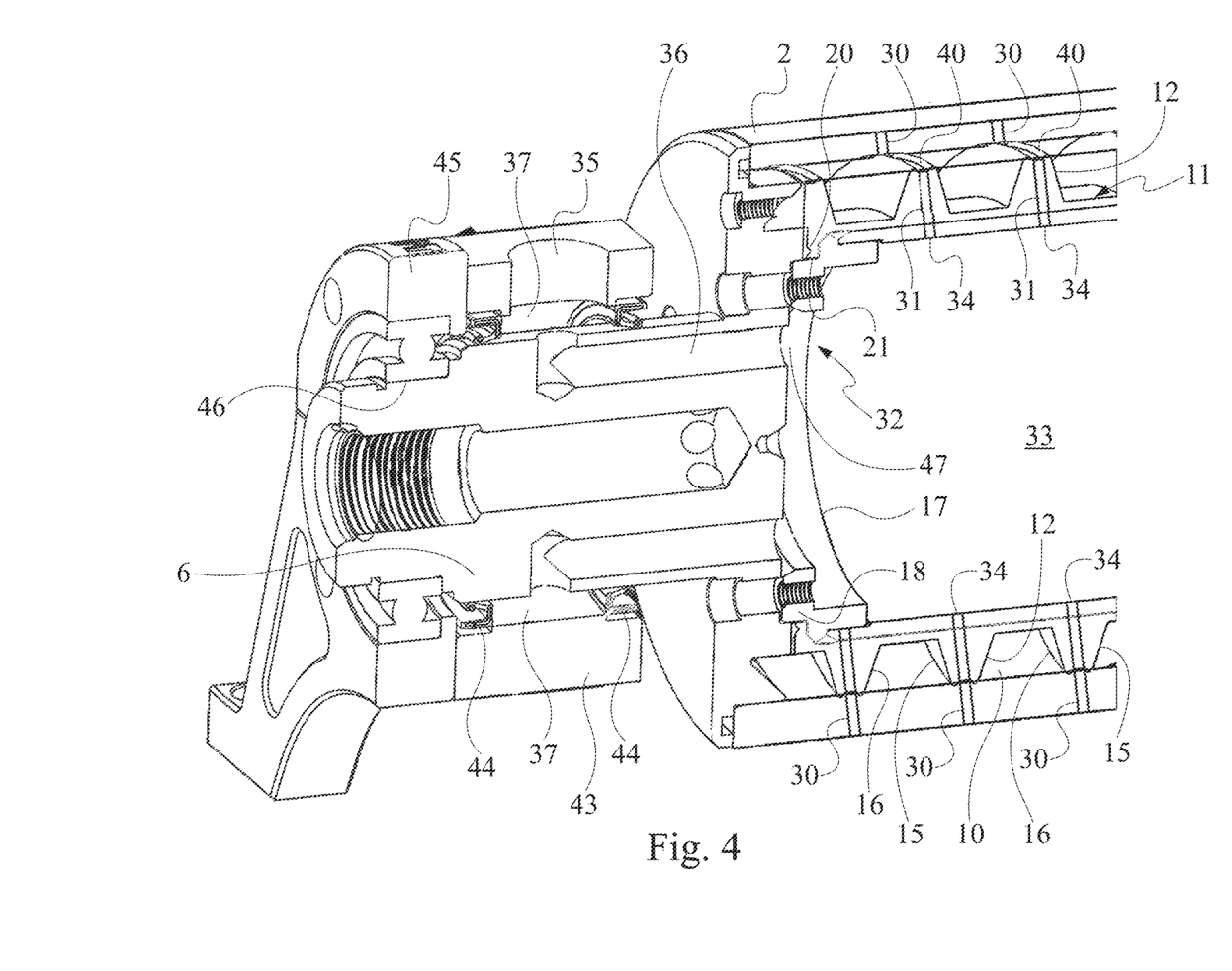
FIG. 4 is a sectional and perspective partial view of a second embodiment of the suction or blow thermal roller of FIG. 1.

Preferably, the passage section of the first helical channel 13, as better shown in FIG. 4, has minimum width C comprised between 0.5 and 1000 mm, limits included.

The passage section of the helical channel 13 is calculated in the basis of the needed thermal gradient with the possibility of achieving such a turbulent motion of the thermal fluid to facilitate the heat exchange. Moreover, the passage section of the first helical channel 13 can not be constant by having such narrowing parts to aid the turbulent motion of the fluid. These narrowing parts can be made with reliefs, projections, humps present on the surface of the first helical channel 13.

Still referring to the embodiment shown in figures, each rib 12 has a shaped section that is tapered while radially leaving the longitudinal direction X-X.

Preferably, each rib 12 has minimum width 1 arranged at the top of the rib 12 itself and maximum width arranged in a position spaced from the top of the said rib 12.

The minimum width 1 of the rib 12 can be comprised between 0 and 100 mm.

The rib 12 further has two opposite and inclined walls 16, each inclined wall 16 having an α angle whose absolute value is comprised in the range 90° to 180°, preferably 100° to 170°, limits included.

The coating layer 11 made of plastics can have more than one rib 12 extending along a helical path around the longitudinal direction X-X substantially for the whole extent of the inner tubular element 3. The higher the number of ribs 12 extending along a helical path, the higher the number of formed first helical channels 13.

Moreover, the outer tubular element 4 has a plurality of first suction holes 30 passing through its outer surface to the inner one 14.

The first suction holes 30 are arranged along a helical path extending around the longitudinal axis X-X on the outer tubular element 4.

The helical path of the first suction holes 30 is substantially coincident with the helical path of the rib 12 of the coating layer 11.

Preferably, the first suction holes 30 are arranged along the helical path in such a way that each first suction hole 30 is followed by another one.

The first suction holes 30 can also be coupled in two side-by-side first suction holes 30 following one another along the helical path, without departing from the protection scope of the present invention.

Along the helical path each first suction hole 30 is spaced from the first subsequent suction hole 30 by a distance from 0.1 mm to 1000 mm. Preferably, from 1 mm to 500 mm.

The first suction holes 30 can have a circular section having diameter d in the range from 0.1 mm and the minimum width 1 of the rib 12.

In other terms, the diameter d of the hole 30 must not exceed the size of the rib 12 in the longitudinal direction at the ridge, i.e. the longitudinal dimension measured at the portion of the rib 12 abutting against the inner surface of the tubular element 2.

The first suction holes 30, passing through the thickness of the outer tubular element 2, are fluidically communicating with a plurality of radial pass-through channels 31 made in the coating layer 11 and, in particular, in the rib 12, these channels in turn are communicating with an air suction assembly 32, as better described in the following.

The radial pass-through channels 31 are radially arranged with respect to the longitudinal axis X-X of the inner tubular element 3, so that the top or the ridge of the rib 12 and the suction duct 33 are connected.

Each radial pass-through channel 31 has a circular section or a section inscribable in a circumference having a diameter lower than 1 cm.

Preferably, the diameter of the section of the radial pass-through channel 31 is substantially coincident with the diameter d of the above first suction hole 30.

Generally, each radial pass-through channel 31 is aligned with a first suction hole 30 made in the outer tubular element 3.

The air suction assembly 32 further comprises at least one suction duct 33 arranged, at least in part, inside the inner tubular element 3 so that the radial pass-through channels 32 are connected to one another.

In the embodiment shown in the figures, the first suction duct 33 is denoted by the inner tubular element 3 itself, but it could be denoted by a longitudinal duct inside the inner tubular element 3, without departing from the protection scope of the present invention.

The first suction duct 33 has a plurality of second suction holes 34, each one contacting and communicating with a radial pass-through channel 31.

The outer surface of the outer tubular element 2 communicates with the first suction duct 33, i.e. with the inside of the inner tubular element 3, through the first suction holes 30 made on the outer tubular element 2, the radial pass-through channels 32 made on the coating layer 11 and the second suction holes 34 made on the inner tubular element 3.

Preferably, the number of second suction holes 34 is equal to the number of radial pass-through channels 31 and each second through hole 34 has section substantially equivalent to the section of the radial pass-through channel 31 communicating therewith.

There could be more second suction holes 34 per each radial channel 31, as well as each second through hole 34 could have section different from the section of the radial pass-through channel 31 communicating therewith, without departing from the protection scope of the present invention.

Preferably, each second through hole 34 faces and is in contact with a radial pass-through channel 31.

In the embodiment shown in the figures, the air suction assembly 32 further comprises at least one coupling member 35 for a suction source fluidically connected to the first suction duct 33, and consequently to the radial channels 31 and the first suction holes 30.

The suction source, not shown in figure, can be a suction pump. The suction pump has the task of suctioning, by making vacuum in the suction assembly 32, the film or support sliding on the outer surface of the outer tubular element 2, so that it adheres thereto. Different typologies of suction pumps (for example, dry pumps, oil pumps, etc.) are available on the market. The selection of the suction pump is made on the basis of pressure drops and depression desired inside the suction assembly and the first suction holes 30.

In the embodiment in which the suction thermal roller operates also as blow roller, the source previously defined as suction source will be a source also able to blow air, such as for example a compressor.

The first suction duct 33 transmits the suction force through a second suction duct 36 made in the hubs 6.

The second suction duct 36 is made in one of the hubs 6 and is arranged parallel to the longitudinal direction X-X.

In the embodiment shown in the figures, the second suction duct 36 has section smaller than the section of the first suction duct 33.

Moreover, in the embodiment shown in the figures, the second duct 36 is communicating with the first suction duct 33 through a hole made in the plug 17 and, at the opposite end, with a circumferential chamber 37 made between the hub 6 and a fixed ring 43 concentrically mounted around the hub 6.

In detail, in the first embodiment shown in the figures, the circumferential chamber 37 is radially defined by the hub 6 and the inner surface of the fixed ring 43, whereas is longitudinally defined by two gaskets 44 spaced out in the longitudinal direction and interposed between the hub 6 and the fixed ring 43, so that a seal for the air suction is obtained. In other terms, the two gaskets 44 interposed between the hub 6 and the fixed ring 43 prevent, or anyway held down, the suction pressure drops.

In FIG. 4 one of the fixed supports 45 of the suction thermal roller 1 is further shown. In particular, the fixed support 45 rotatably houses a hub 6 of the suction thermal roller 1 by a suitable seat 46.

Figure 1:
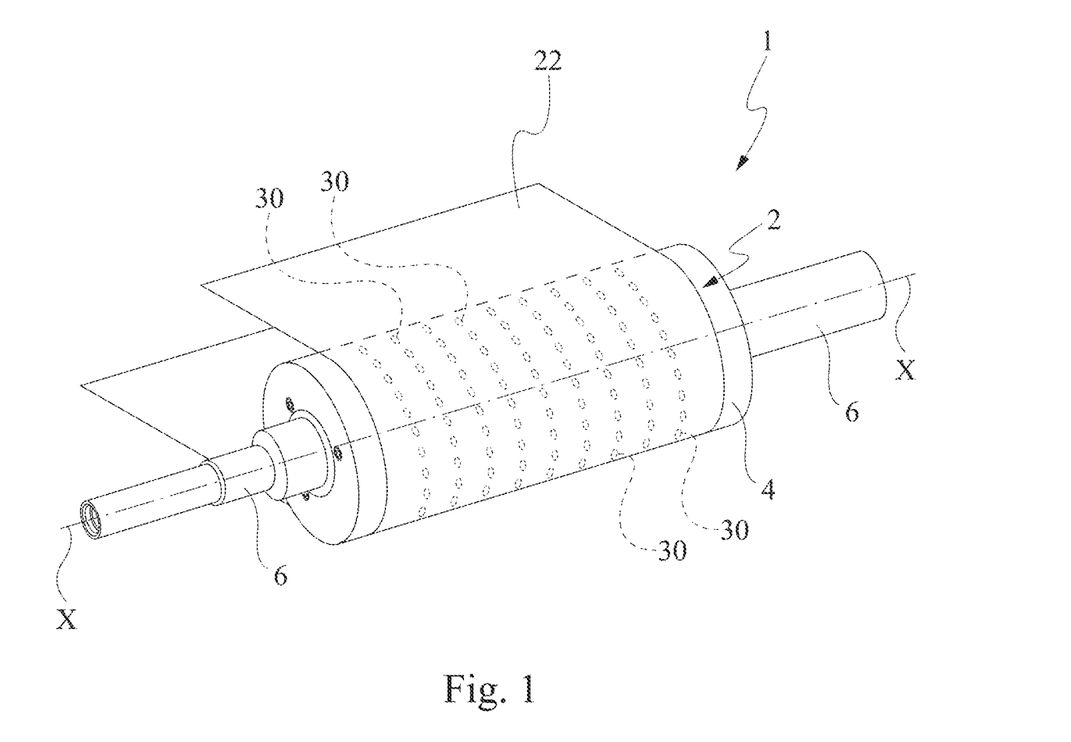
FIG. 1 is a schematic perspective view of a suction or blow thermal roller according to the present invention.
Figure 2:
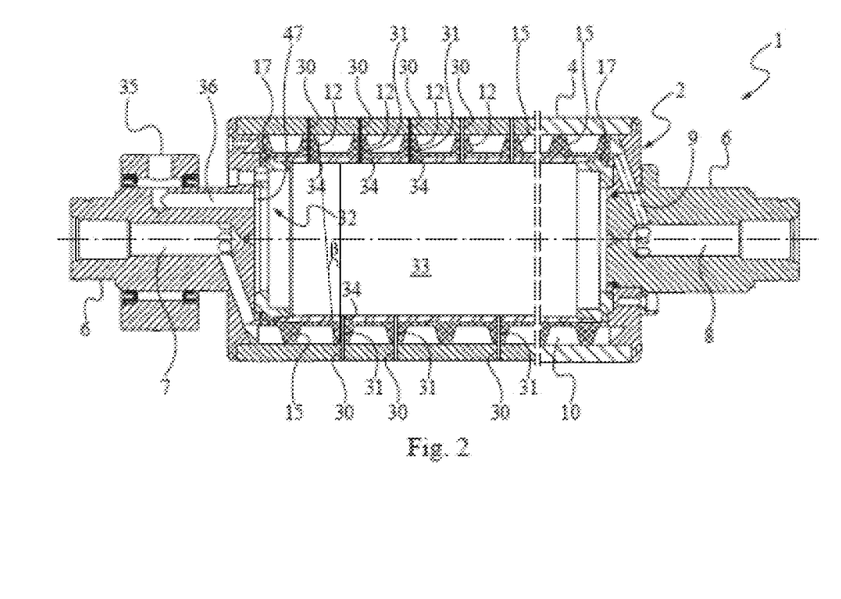
FIG. 2 is a schematic sectional view of a first embodiment of the suction or blow thermal roller of FIG. 1.
Figure 3:
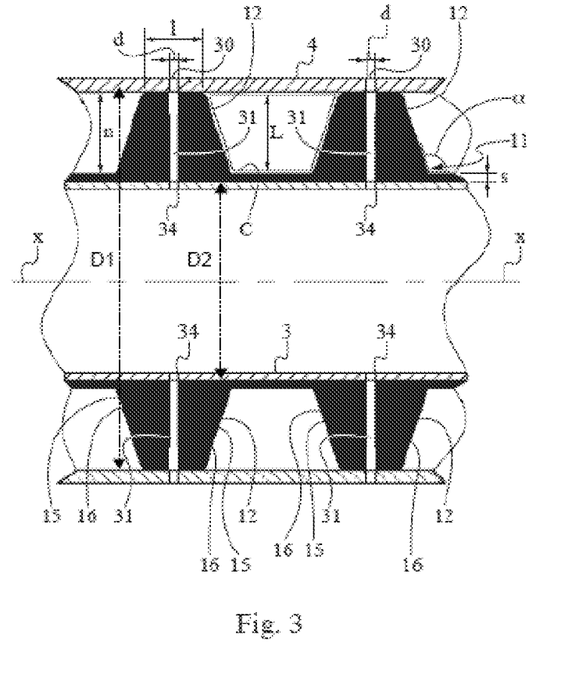
FIG. 3 is an enlarged sectional view of a portion of the suction or blow thermal roller of FIG. 2.
Figure 5:
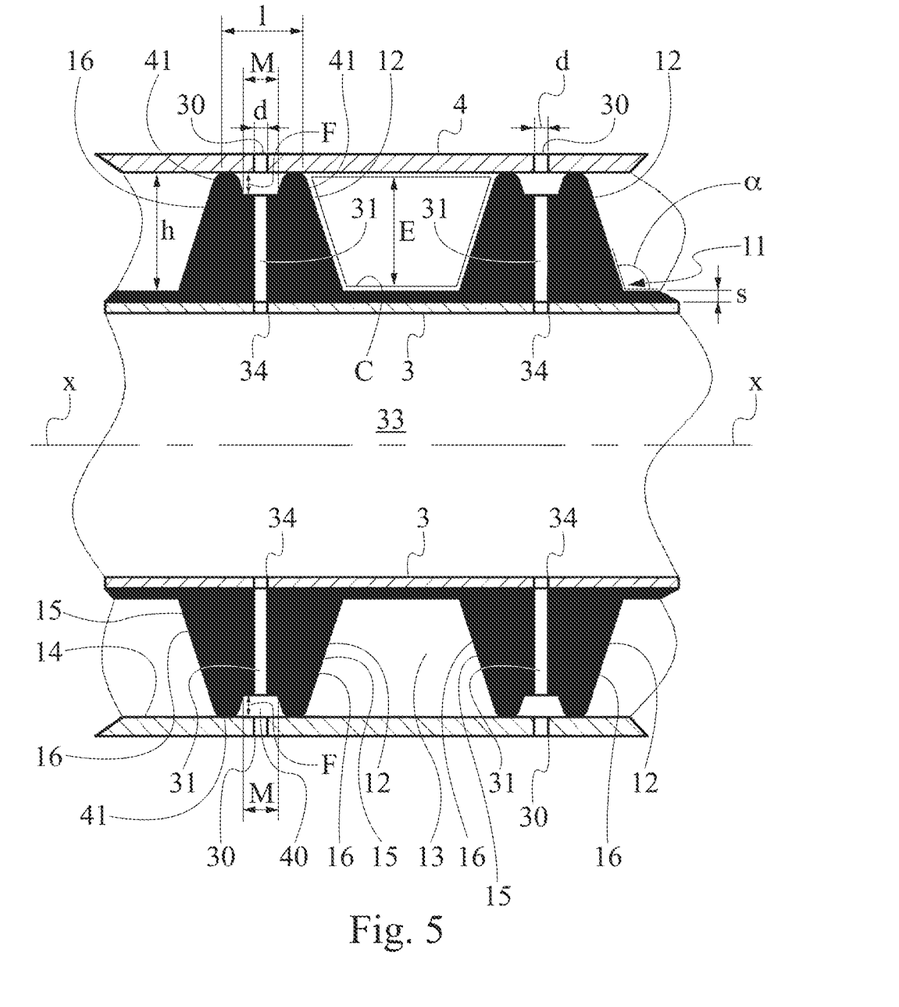
FIG. 5 is an enlarged sectional view of a portion of the suction or blow thermal roller of FIG. 4.

In FIGS. 4 and 5, a second embodiment of the invention is shown completely similar to the first embodiment shown in the FIGS. 2 and 3, with the exception of having a second helical channel 40 in the coating layer 11 and, in particular, on the ridge of the rib 12.

The second helical channel 40 has the function of realizing a helical suction chamber between the radial channels 31 and the first suction holes 30.

In particular, in the embodiment shown in the FIGS. 4 and 5, the second helical channel 40 is made between two sealing edges 41 of the ridge of the rib 12, which are longitudinally spaced out from one another.

Ridge of the rib 12 means the top of the rib 12.

The two sealing edges 41 abut against the inner surface of the outer tubular element 4, thus making a seal on the one hand preventing suction losses (or pressure drops) of the second helical channel 40 and, on the other hand, the liquid circulating in the first helical channel 13 from coming out from the first helical channel 13 and entering the second helical channel 40.

Preferably, to avoid local tensions or undesired wear, the sealing edges 41 are rounded.

The second helical channel 40 has a trapezium-like section with height F in the range from 0 to 500 mm and smaller base M in the range from 0 and 1000 mm, the latter corresponding to the minimum longitudinal dimension of the second helical channel.

The second helical channel 40 can have a section with a different shape, without departing from the protection scope of the present invention.

According to an embodiment not shown, two or more second paired helical channels 40 can be made on the ridge of the rib 12, each one communicating with one or more radial channels 31.

The present invention has been described referring to some embodiments.

Various modifications may be made to the embodiments herein described in detail, being still within the protection scope of the invention, defined by the following claims.

The invention claimed is:

1. A suction or blow thermal roller comprising:
a cylindrical body extending along a longitudinal direction, said cylindrical body comprising at least one inner tubular element and at least one outer tubular element that is concentrically arranged around said inner tubular element, said inner tubular element comprising an outer diameter D2 and said outer tubular element comprising an inner diameter D1, wherein D1>D2;
two hubs, each arranged at one end of the cylindrical body;

at least one heat-exchange chamber disposed between said inner tubular element and said outer tubular element; and a coating layer for said inner tubular element, said coating layer comprising at least one rib arranged along a helical path around said longitudinal direction, said at least one rib being made in one piece in the coating layer and defining at least one first helical channel between said inner tubular element and said outer tubular element, said first helical channel being made at least partially in said coating layer so that said at least one rib forms the side walls of said first helical channel, said rib comprising a plurality of radial pass-through channels, wherein said outer tubular element comprises a plurality of first suction holes communicating with said radial pass-through channels that communicate with an air suction assembly comprising at least one first suction duct disposed, at least in part, inside said inner tubular element so that said radial pass-through channels are connected to one another, and at least one coupling member for a suction source fluidically connected to said at least one first suction duct, wherein each of the radial pass-through channels is disposed at a respective first suction hole, and wherein said first suction duct has a plurality of second suction holes respectively communicating with the radial pass-through channels.

2. The suction or blow thermal roller according to claim 1, wherein said coating layer is made of plastics.

3. The suction or blow thermal roller according to claim 1, further comprising a second helical channel disposed between a ridge of said rib and the outer tubular element.

4. The suction or blow thermal roller according to claim 3, wherein said rib comprises two sealing edges longitudinally spaced and opposed with respect to said second helical channel, which abut against the inner surface of said outer tubular element to create a seal for the air suction.

5. The suction or blow thermal roller according to claim 3, wherein said second helical channel has a trapezium-like section with height in the range from 0 to 500 mm and base in the range from 0 and 1000 mm.

6. The suction or blow thermal roller according to claim 1, wherein said coating layer made of plastics has a minimum thickness greater than 0.5 mm.

7. The suction or blow thermal roller according to claim 1, wherein each of the ribs has a shaped section that is tapered while radially leaving the axial direction.

8. The suction or blow thermal roller according to claim 1, wherein said first suction duct communicates with said coupling member for a suction source, through a second suction duct obtained in at least one hub.

9. The suction or blow thermal roller according to claim 1, wherein each of the ribs has two opposite inclined walls, each inclined wall having an α angle whose absolute value is comprised in the range 90° to 180°.

* * * * *